W. F. PFISTER.
AUTOMATIC MOTOR SWITCH.
APPLICATION FILED JAN. 18, 1918.

1,306,076.

Patented June 10, 1919.

INVENTOR
Winifred F. Pfister
by
Owen, Owen & Crampton

UNITED STATES PATENT OFFICE.

WINFRED F. PFISTER, OF LEIPSIC, OHIO, ASSIGNOR TO THE TEMCO ELECTRIC MOTOR COMPANY, OF LEIPSIC, OHIO, A CORPORATION OF OHIO.

AUTOMATIC MOTOR-SWITCH.

1,306,076.   Specification of Letters Patent.   Patented June 10, 1919.

Application filed January 18, 1918. Serial No. 212,474.

*To all whom it may concern:*

Be it known that I, WINFRED F. PFISTER, a citizen of the United States, and a resident of Leipsic, in the county of Putnam and State of Ohio, have invented a certain new and useful Automatic Motor-Switch; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

The invention relates to automatic devices for opening the circuit of starting coils of induction motors. It has for its object to provide an efficient centrifugal operated switch which will open the circuit of the starting winding when the speed of the rotor has approximated the speed at which the field windings will maintain the motor under its normal load, or approximating the speed a little better than that which the field windings will operate on the rotor to give to the rotor its requisite speed.

The invention may be contained in centrifugally operated switches of different forms and used for different purposes. I have selected one form of construction which is illustrative of different forms of constructions containing my invention and shall describe it hereinafter. The structure selected is illustrated in the accompanying drawings.

Figure 1:
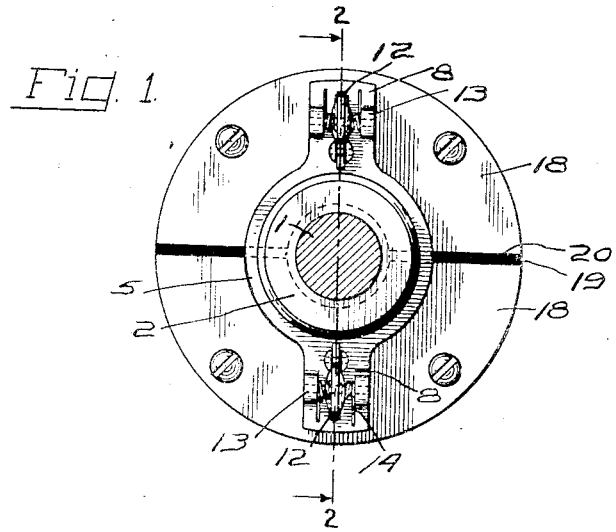
Figure 2:
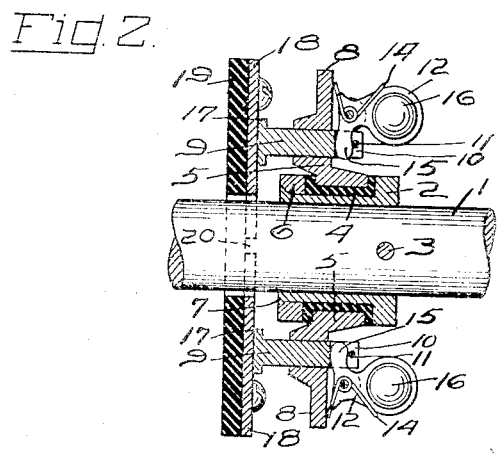
Figure 3:
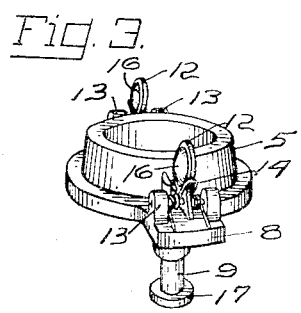
Figure 4:
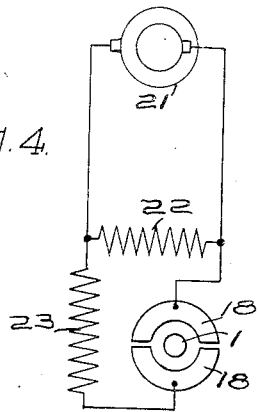

Figure 1 is a side or face view of the switch, Fig. 2 is a sectional view of the switch taken on the line 2—2 indicated in Fig. 1. Fig. 3 is a perspective view of a brush carrying bracket, Fig. 4 is a diagrammatic illustration of the motor and switch circuit.

1, Fig. 1, is the shaft of the induction motor to which is keyed a sleeve 2 by any suitable means such as the pin 3. An insulating ring or shell 4 surrounds the sleeve 2. A bracket or frame 5 is insulated from the sleeve 2 and the shaft 1 by the sleeve or shell of insulating material 4 which the bracket surrounds. The shell 4 and the frame or bracket 5 are held in position on the sleeve 2 by a ring 6 which may be secured to the sleeve 2 in any suitable manner such as upsetting the end 7 of the sleeve 2. The frame or bracket 5 is provided with extending arms 8 in which are located brushes 9 that extend through openings formed in the arms 8. The brushes 9 are provided with slots 10 through which extend pins 11. Weighted levers 12 are pivotally supported in ears 13 located on the arms 8. The weighted levers are spring pressed by means of springs 14 which operate to throw the weighted ends of the levers 12 toward the shaft 1. The levers 12 have fingers 15 which extend into the slots 10 and beneath the pins 11. The fingers 15 are preferably rounded at their outer ends to reduce friction caused by movement of the fingers 15 against the bottoms of the slots 10 or against the pins 11. The levers 12 are provided with weights 16 which may be forced into openings formed in the levers and secured therein in any suitable manner such as by upsetting edges of the weights 16 so as to clamp the levers 12 between the edges of the weights 16.

The brushes 9 are provided preferably with feet 17 which bear against semi-circular contact rings 18. The contact rings 18 are supported on a suitable insulating plate 19 which may be supported and held stationary in any suitable manner around the shaft 1. The ends of the substantially semi-circular contact rings 18 are separated by a small gap 20, which however is readily bridged by the feet 17 of the brushes 9.

When the frame with the brushes and the spring pressed weighted levers 12 are rotated by the shaft 1, the action of the weights 16 is that they tend to lift or remove the brushes 9 from contact with the rings 18. This action of the weights 16 is countered by the yielding resistance of the springs 14 so that the brushes 9 will not be removed from the contacts 18 until the speed of the shaft 1 is such as to give sufficient centrifugal force to the weights 16 that they will overcome the yielding resistance of the springs 14. If the semi-circular contact plates 18 are connected to the terminals of a circuit, the circuit will be broken when the brushes 9 are removed from the plates by the speed of the motor when it is sufficient to cause the levers 12 to lift or remove the brushes 9 from the contact plates 18 and the circuit will be completed when the speed of the motor is below the requisite speed to cause the levers 12 to operate on the brushes 9.

The automatic switch may thus be used in opening and closing the starting winding of an induction motor. In Fig. 4 is shown diagrammatically the connections of the switch to an induction motor. 21 designates the source of alternating current to which the motor is represented as being connected. 22 is the field winding of the motor and is of the form of winding commonly located in the stator of such motors. 23 is the starting winding. One of the plates 18 is connected with one terminal of the field winding 22 and the main line from the source 21. The other plate 18 is connected to the starting winding 23, the starting winding 23 being connected to the terminal of the field winding 22 and to the main line leading from the source 21. When the shaft 1 of the motor has reached a speed produced by the combined effect of the coils 22 and 23 sufficient to cause the brushes to be lifted from the plates 18, the circuit of the starting winding 23 will be opened. It will be automatically closed when the motor stops running.

The speed of the shaft 1 that will cause the circuit of the starting winding to be broken may be varied by varying the relation between the tension of the springs 14 and the weight of the bodies 16.

I claim:

1. In an automatic switch, a pair of stationary semi-circular contact rings separated from each other by small gaps and connected in a circuit, a shaft, a ring having arms and secured to the shaft, contact members extending through the arms, the members having recesses, a pair of pivoted bell crank members having arms extending into the recesses of the contact members, and springs operating upon the bell crank members for pushing the contact members through the last named ring to make contact with the semi-circular contacts.

2. In an automatic switch, a pair of stationary semi-circular contact rings separated from each other by a small gap and connected in a circuit, a ring, a shaft, means for insulatingly and mechanically connecting the ring to the shaft, the ring having bosses forming bearings, contact members movable through the bearings to make contact with the semi-circular rings, bell crank members having arms for moving the contact members through the bearings and the other arms of the bell crank members having weights for moving the contact members away from the semi-circular rings, springs operating to move the bell crank levers to force the contact members against the semi-circular rings.

In testimony whereof, I have hereunto signed my name to this specification.

WINFRED F. PFISTER.